Figure 1:
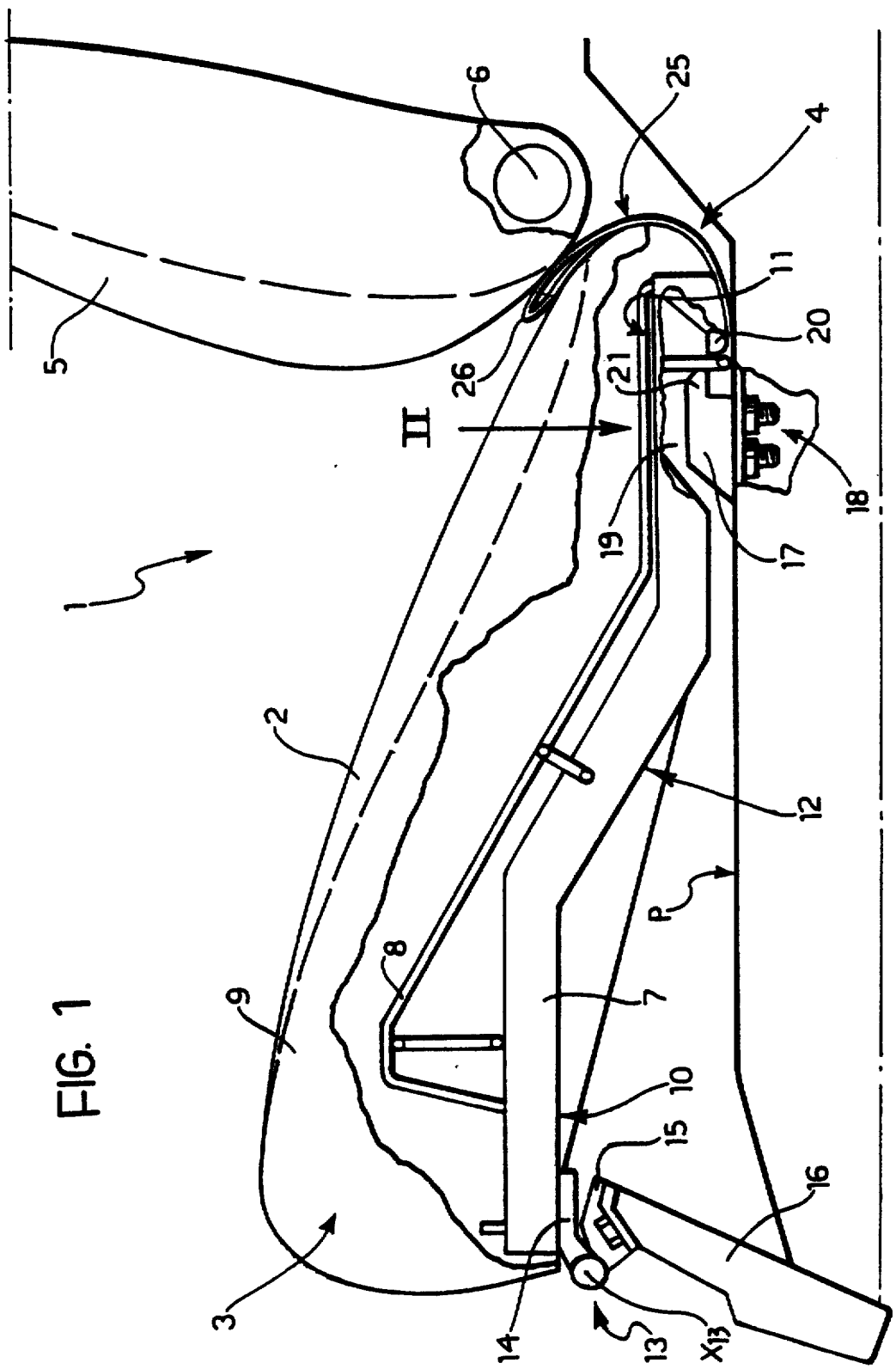

United States Patent [19]

Acuto et al.

[11] Patent Number: 4,993,776
[45] Date of Patent: Feb. 19, 1991

[54] VEHICLE SEAT

[75] Inventors: Giovanni Acuto, Orbassano; Giuseppe Rovero, Turino, both of Italy

[73] Assignee: Fiat Auto S.p.A., Turino, Italy

[21] Appl. No.: 452,484

[22] Filed: Dec. 19, 1989

[30] Foreign Application Priority Data

Dec. 21, 1988 [IT] Italy .................... 68135 A/88

[51] Int. Cl.$^5$ ............................. B60N 1/10
[52] U.S. Cl. ..................... 297/216; 296/68.1; 297/336
[58] Field of Search ............. 297/216, 331, 335, 336; 296/68.1, 65.1, 63

[56] References Cited

U.S. PATENT DOCUMENTS

| | | |
|---|---|---|
| 1,957,004 | 5/1934 | Smith . |
| 2,660,222 | 11/1953 | Woodsworth ............... 297/216 |
| 2,873,794 | 2/1959 | Leslie et al. . |
| 3,207,549 | 9/1965 | Posh ............... 297/216 X |
| 3,524,677 | 8/1970 | Louton . |
| 4,804,229 | 2/1989 | Nishino ............... 297/216 X |
| 4,832,409 | 5/1988 | Berlinghaus et al. ............ 297/216 X |

FOREIGN PATENT DOCUMENTS 0067123 6/1982 European Pat. Off. .
991342 5/1965 United Kingdom .

Primary Examiner—Peter R. Brown
Attorney, Agent, or Firm—Sughrue, Mion, Zinn, Macpeak & Seas

[57] ABSTRACT

In a vehicle seat having a squab pivotally mounted on the vehicle floor adjacent the front of the squab, a normally engaged coupling is connected between the rear of the squab and the floor to prevent forwardly tilting of the squab. An operating device is provided for selectively disengaging the coupling. A normally disengaged coupling is also provided between the rear of the squab and the vehicle floor. Upon deformation of the squab in a forward direction during a collision the normally disengaged coupling will become engaged to prevent forward tilting of the squab.

6 Claims, 2 Drawing Sheets

VEHICLE SEAT

The present invention relates to vehicle seats and is particularly concerned with a seat comprising a squab which extends forwardly-rearwardly of the passenger compartment of the vehicle between a front region and a rear region.

Seats of the type specified above are currently used in the automotive industry. In some of these seats, particularly those used as rear seats (so-called "bench" seats) of motor cars, the squab can be tilted forwards until it reaches an approximately vertical position, in order to enable the backrest to be folded down with a consequent increase in the volume of the rear luggage compartment.

In some particular situations of use, for example, when the vehicle decelerates very rapidly as a result of a collision, there is a risk that the squab of the seat, or the seat as a whole, may tilt forwards, throwing the person occupying the seat forwards with a considerable risk of injury.

The object of the present invention is to produce a vehicle seat of the type specified above, in which the above problem is eliminated.

According to the present invention, this object is achieved by virtue of a vehicle seat of the type specified above, characterised in that normally-disengaged coupling means are interposed between the floor of the passenger compartment and the seat and can be brought into a coupling position so as to prevent the seat from tilting forwards, as a result of a deformation of the seat in a forward-rearward direction.

The squab of the seat according to the invention is preferably made so as to be subject to deformation in a forward-rearward direction (this term also including any deformation or breakage of the supports for connection to the floor of the passenger compartment) as a result of a mechanical stress greater than a given threshold level. This threshold level can be determined for each vehicle, for example, experimentally with the use of dummies which simulate the behaviour of the body of a person occupying the seat, so as to correspond to the forward-rearward deformation stress of the seat imposed on the squab by a person occupying the seat in the event of a deceleration of the order of that which occurs in a motor vehicle during very sharp braking and/or a collision.

In other words, in the seat according to the invention, the normally-disengaged coupling means do not play any specific role during the normal life of the vehicle.

In the event of a sharp deceleration, such as that resulting from a collision, the squab is subject to a deformation which brings the normally-disengaged coupling elements into a position in which they are firmly coupled: the squab is therefore securely held in a horizontal position.

According to a particularly advantageous embodiment of the invention, the front region of the squab is situated in a generally higher position than the rear region of the squab under the normal conditions of use of the seat.

In other words, in the seat according to the invention, the front region of the squab is mounted well above the floor of the passenger compartment so that the resultant of the inertial forces applied by the passenger to the squab in the event of a sharp deceleration acts at a very small distance from the imaginary forward tilting axis, if not directly beneath it, whereby the resultant pivoting moment, instead of tending to tilt the squab upwards and forwards, tends to pivot the squab in the opposite sense, downwardly, so as to keep the squab firmly in the position in which it bears on the floor of the passenger compartment.

Figure 5:
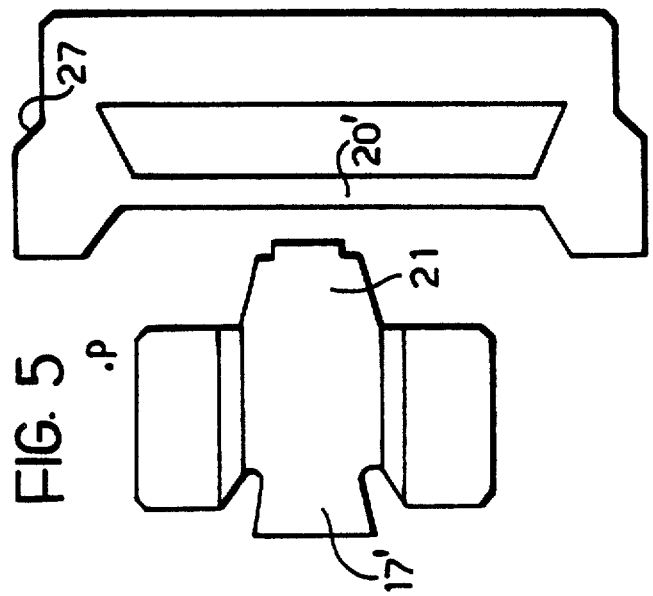
Figure 4:
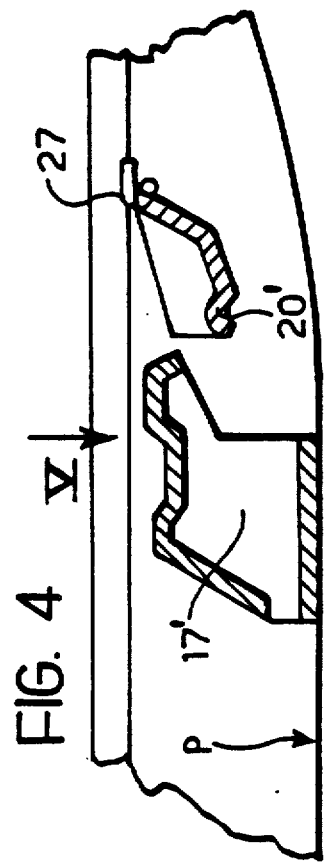
Figure 2:
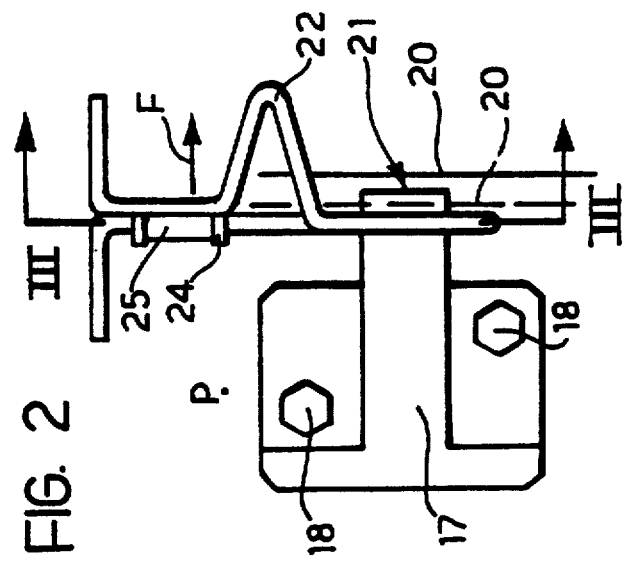
Figure 3:
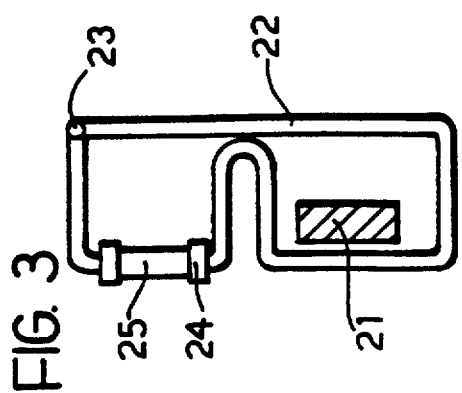

The invention will now be described, purely by way of non-limiting example, with reference to the appended drawings, in which:

FIG. 1 is a partially cut-away and sectioned side elevational view of a seat according to the invention, FIG. 2 is a plan view of the part of the seat of FIG. 1 indicated by the arrow II in FIG. 1, on an enlarged scale, FIG. 3 is a view taken on the line III—III of FIG. 2, FIG. 4 corresponds approximately to the lower right-hand portion of FIG. 1 and shows a possible variant of the invention, and FIG. 5 shows the variant of FIG. 4 from a direction which corresponds approximately to the arrow V of FIG. 4.

In the drawings, a seat, such as, for example, the rear seat (bench) of a motor car, not illustrated as a whole, is generally indicated 1.

According to widely known criteria, the seat 1 is intended to be mounted on a floor P of the passenger compartment of the motor vehicle and comprises:

a seat part (or a "squab" for short) 2 which extends forwardly-rearwardly of the passenger compartment of the motor vehicle between a front region 3 and a rear region 4, and a backrest 5 which projects upwards from the rear region 4 of the squab 2.

For the purposes of the present description which, as stated, is given purely by way of non-limiting example, it is assumed that, whilst it cooperates functionally with the squab 2 when the latter is in the horizontal position, the backrest 5 is not actually connected to the squab 2 but is provided with respective elements for its support on the bodywork of the motor vehicle.

For example, the backrest 5 may be mounted on a pair of horizontal pins 6 connected to the sides of the motor vehicle so that it can be folded down selectively, after the squab 2 has been tilted forwards, to increase the volume of the luggage compartment behind the seat 1.

Naturally, it is understood that the terms "front" and "rear", "forwards" and "rearwards" and terms derived therefrom, as used in the present description and in the claims which follow, are intended to refer to the normal direction of travel of the motor vehicle in which the seat 1 is mounted.

The squab 2 is constituted, also according to a known solution, by a metal framework 7 supporting a rigid reticulated structure 8 which is in turn covered by a mass of padding (upholstery) 9.

When seen in longitudinal section (that is, in a plane parallel to the longitudinal median plane of the motor vehicle), the framework 7 has a generally S-shaped profile with a front end 10 and a rear end 11 which extend approximately horizontally (when the squab 2 is in the normal position of use) and are connected by an intermediate portion 12 which is inclined so that the front end of the framework 10 (and the front region 3 of the squab 2 as a whole) are situated in a higher position than the rear region of the framework and the rear region 4 of the squab 2.

In other words, the squab of the seat according to the invention has a generally dished shape with a raised front edge for improving the restraint of the passenger's body and preventing it from sliding forwards as a result of deceleration. This restraint is particularly beneficial if the passenger is wearing a safety belt.

In the seat illustrated by way of example, the squab 3 is mounted on the floor P of the passenger compartment by means of hinge units 13 comprising an upper element 14 fixed to the front end 10 of the framework 7 and a lower element 15 fixed (usually by screws) to a rib or cross member 16 which projects from the floor P along a line generally transverse the motor vehicle.

The elements 14 and 15 of the hinge units 13 (two or three of which are provided in dependence on the dimensions of the seat) articulate the squab 2 about an axis $X_{13}$ which extends horizontally transverse the motor vehicle.

As a result of the raised position of the front region 3 of the squab 2, the hinge elements 13 fixed thereto (and hence the axis $X_{13}$) are also in a generally raised position relative to the rear region 4 of the seat.

Coupling elements are interposed between the floor P and the squab 2 in correspondence with this rear region and, for the purposes of an understanding of the present invention, can be divided into:

safety coupling elements which are normally disengaged and are intended to intervene to hold the squab 2 in the horizontal position, resisting the forward tilting movement, only as a result of a deformation of the squab 2 in a forward-rearward direction (including any deformation and/or breakage of the hinge units 13) such as that which occurs in the event of a collision, coupling elements (defined in the following claims as "further coupling means") which are normally engaged and can be brought selectively to a released position to enable the squab 2 to be tilted forwards and to allow the luggage compartment behind the seat 1 to be extended after the squab 5 has been folded forwards.

A hooked element, indicated 17 in FIGS. 1 and 2, is fixed (for example, by means of screws 18) to the floor of the passenger compartment beneath the rear region 11 of the framework of the squab 2.

In correspondence with the hooked element 17 (which may be reproduced in the form of two or more elements distributed symmetrically along the rear region of the squab 4), the framework 7 of the squab 2 has a recess 19 with an edge 20 which faces the rearward-facing tip 21 of the hook 17 like a catch element.

The expression "faces . . . like a catch element" is intended to indicate a situation in which the edge 20, whilst not normally being engaged by the hook 17, has dimensions and a position such that, once it has been displaced towards the hooked element 17 (which, as will be seen better below, occurs as a result of a plastic deformation of the framework 7 resulting from the force of a collission), it can establish a firm engagement with the element 17.

Another coupling element, however, is indicated 22 and is usually constituted by a shaped loop of wire which extends around the tip 21 of the coupling element 17 to surround it like a noose.

The element 22 is fixed to the framework 7 within the recess 19, in correspondence with respective leg portions 23.

Consequently, therefore, when the element 22 is in the rest position (that is, in the condition shown in detail in FIGS. 2 and 3), any forward tilting of the squab 2 about the axis $X_{13}$ is prevented by the engagement of the element 22 around the element 17.

More precisely, in the embodiment illustrated, the element 22 is 8- or β-shaped with an outer loop which surrounds the tip 21 of the hooked element 17 and an inner loop around which an end loop of a flexible tie 25 is fitted with the interposition of an antifriction bush 24, the opposite end 26 of the flexible tie projecting forwardly in the gap between the rear edge of the squab 2 and the lower edge of the backrest 5 so then it ca be gripped from the outside of the seat.

The exertion of a pull on the element 25, which passes around the rear edge of the squab 2 to form a loop (see FIG. 1 in particular), enables the element 22 to be bent in the direction schematically indicated by the arrow F of FIG. 2, so as to release the outer loop from the tip of the hooked element 17.

Under these conditions, the squab 2 is released from the floor P and can be tilted upwards and forwards around the axis $X_{13}$.

In the normal conditions of use of the motor vehicle, the edge 20 of the framework 7 remains securely at a certain distance from the tip 21 of the element 17 and therefore in no way obstructs the forward tilting of the squab 2.

However, when the vehicle in which the seat 2 (occupied by a person) is fitted is subjected to a sharp deceleration, such as occurs in the event of a collision, the inertial force of the body of the person occupying the seat is translated into a violent forward thrust applied to the squab 2 relative to the floor P (particularly at the hinge units 13) and hence into a deformation stress applied to the framework 7 in a forward-rearward direction.

With its particular S-shaped transverse shape, the latter is made so that it remains substantially undeformed as long as the intensity of the forward-rearward deformation stress remains below a certain threshold level.

As already stated, this threshold level is selected, usually by experimental means, so as definitely to be exceeded by the stresses induced by the inertial mass of a person occupying the seat in the event of a deceleration typical of a collision.

When this threshold is exceeded, the framework 7 of the squab 2 undergoes plastic deformation (perhaps as a result of plastic yielding, with possible breakage, of the hinge units 13) so that the edge 20 is displaced forwardly relative to the hooked element 17 and moves, for example, towards the position shown schematically in broken outline in FIG. 2.

Under these conditions, the hooked element 17 is brought into a position in which it is firmly coupled with the framework 7 of the squab 2 and prevents it from tilting forwards, even in the presence of stresses which could easily overcome the reaction offered by the element 22.

The forward tilting of the squab 2 is also resisted by the raised arrangement of the hinge axis $X_{13}$ and of the front region of the squab 2 in general.

In fact, the resultant of the inertial forces applied by the person occupying the seat with the squab 2 in the event of a sharp deceleration tends to be applied either much lower than the axis $X_{13}$, so as to shorten the arm of the forward tilting moment, or even directly below the axis $X_{13}$, so that, instead of assisting the forward and upward tilting of the squab 2, the inertial forces act in the opposite sense whereby the frame 7 and the squab 2 as while are thrust downwardly against the floor P.

FIGS. 4 and 5 show schematically a possible variant of the invention, in which the hooked element, indicated 17', rather than being screwed to the floor P, is welded thereto by an operation which can easily be carried out automatically. Moreover, instead of being constituted by a shaped solid piece as in the case of the element 17 shown in FIGS. 1 to 3, the element 17' is made of pressed sheet metal, with a consequent reduction in weight.

This is also true as regards the production of the catch edge 20 which is defined, in the embodiment of FIGS. 4 and 5, by an elongate element 20' having a generally channel-shaped section with its concavity facing downwards. The element 20' constitutes a bridge which closes a C-shaped element 27 made of pressed sheet metal and fixed to the framework 7, for example by welding.

As in the case of the hooked element 17, the element 17' also simultaneously constitutes part of the safety coupling means which are intended to be brought into the engagement position only in the event of a collision (the engagement of the tip 21 with the catch element 20 or 20' as a result of a plastic deformation of the framework 7) and of the further coupling means (the engagement of the tip 21 with the shaped element 22 which ensures the everyday retention of the seat in a horizontal position under normal conditions of use of the vehicle).

For this purpose, a resilient retaining element, such as the element 22 shown in FIGS. 2 and 3, may also be associated with the hooked element 17' of FIGS. 4 and 5, according to criteria structurally similar to those illustrated in FIGS. 2 and 3.

Naturally, the principle of the invention remaining the same, the forms of embodiment and details of construction may be varied widely with respect to those described and illustrated, without thereby departing from the scope of the present invention. This is particularly true of the application of the invention to non-tiltable seats.

We claim:

1. A vehicle seat comprising a squab having a front end portion and a rear end portion,
   pivot means having a hinge axis pivotally mounting the front end portion of the squab on a floor of a vehicle passenger compartment,
   normally-disengaged coupling means mounted on the floor of the passenger compartment and the squab and adapted to be brought into a coupling position as a result of a deformation of the squab in a forward direction from said rear end portion to said front end portion,
   normally engaged coupling means mounted on the floor of the passenger compartment and the squab and
   operating means connected to said normally engaged coupling means for selectively moving said normally engaged coupling out of engagement in order to enable the forward tilting of the squab about said hinge axis.

2. A vehicle seat as set forth in claim 1, wherein said front end portion of the squab is disposed in a position generally higher than the rear end portion of the squab relative to the floor in the normal position for use of the seat.

3. A vehicle seat as set forth in claim 1, wherein said squab includes a generally elongated Z-shaped framework extending between said front end portion and said rear end portion with said front end portion mounted in a position higher than said rear end portion relative to said floor.

4. A vehicle seat as set forth in claim 1, wherein each of said coupling means is comprised of two complementary elements, one of which is common to both said coupling means and is comprised of a hooked element mounted on one of the floor and the squab.

5. A vehicle seat as set forth in claim 4, wherein said hooked element is mounted on the floor of the passenger compartment and a catch element is mounted on said squab, said hooked element and said catch element constituting said complementary elements of said normally disengaged coupling means.

6. A vehicle seat as set forth in claim 4, wherein said hooked element is mounted on the floor of the passenger compartment and a wire loop-like member is pivotally mounted on said squab about said hooked element, said hooked element and said loop-like element constituting said complementary elements of said normally engaged coupling means.

* * * * *